United States Patent
Kuske et al.

(10) Patent No.: US 11,208,971 B2
(45) Date of Patent: Dec. 28, 2021

(54) METHODS AND SYSTEMS FOR MITIGATING CONDENSATE FORMATION

(71) Applicant: Ford Global Technologies, LLC, Dearborn, MI (US)

(72) Inventors: Andreas Kuske, Geulle (NL); Vanco Smiljanovski, Bedburg (DE); Joerg Kemmerling, Monschau (DE); Franz Arnd Sommerhoff, Aachen (DE); Helmut Matthias Kindl, Aachen (DE); Hanno Friederichs, Aachen (DE); Frank Wunderlich, Herzogenrath (DE); Frank Kraemer, Neunkirchen-Seelscheid (DE); Lutz Henkelmann, Stolber (DE)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 16/745,129

(22) Filed: Jan. 16, 2020

(65) Prior Publication Data

US 2020/0224613 A1 Jul. 16, 2020

(51) Int. Cl.
*F02M 26/04* (2016.01)
*F02M 26/35* (2016.01)

(52) U.S. Cl.
CPC ............ *F02M 26/04* (2016.02); *F02M 26/35* (2016.02)

(58) Field of Classification Search
CPC ........ F02M 26/04; F02M 26/06; F02M 26/35; F02M 35/10262; F02B 37/00; F02B 39/16; F04D 27/0246; F04D 27/002; F04D 27/003; F04D 27/0253; F04D 29/706; F04D 29/462; F04D 29/464; F04D 29/4213; F02C 6/12; F02C 7/052; F05D 2220/40; F05D 2260/608
USPC ........ 60/605.2, 605.1, 611; 415/169.2–169.3
See application file for complete search history.

(56) References Cited

U.S. PATENT DOCUMENTS

| | | | |
|---|---|---|---|
| 3,672,786 A * | 6/1972 | Mount | F04D 29/464 415/147 |
| 3,922,108 A * | 11/1975 | Benisek | F04D 29/464 415/116 |
| 6,748,741 B2 | 6/2004 | Martin et al. | |
| 7,322,191 B2 * | 1/2008 | Tonetti | F02M 26/10 60/605.1 |
| 7,926,473 B2 | 4/2011 | Currie et al. | |
| 8,056,338 B2 | 11/2011 | Joergl et al. | |
| 8,156,741 B2 * | 4/2012 | Talmon-Gros | F04D 29/441 60/605.1 |
| 8,579,585 B2 * | 11/2013 | Hermann | F04D 29/44 415/200 |
| 9,828,922 B2 | 11/2017 | Kemmerling et al. | |

(Continued)

FOREIGN PATENT DOCUMENTS

| | | | | |
|---|---|---|---|---|
| DE | 202014100190 U1 | 3/2014 | | |
| DE | 102019200469 A1 * | 7/2020 | | F02M 26/06 |

(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for a condensation mitigation device. In one example, a system may include a vortex generator arranged in a flow channel of a compressor along with a condensate collection device configured to direct condensate away from compressor blades of the compressor.

17 Claims, 9 Drawing Sheets

(56) References Cited

U.S. PATENT DOCUMENTS

| | | | |
|---|---|---|---|
| 2004/0009061 A1* | 1/2004 | McDonald | F04D 29/464 |
| | | | 415/151 |
| 2008/0127644 A1* | 6/2008 | Codan | F04D 29/4213 |
| | | | 60/600 |
| 2009/0208331 A1* | 8/2009 | Haley | F04D 29/4213 |
| | | | 415/191 |
| 2010/0205949 A1 | 8/2010 | Bolda et al. | |
| 2011/0011084 A1 | 1/2011 | Yanagida et al. | |
| 2014/0150758 A1 | 6/2014 | Zurlo et al. | |
| 2015/0377190 A1* | 12/2015 | Smiljanovski | F02M 35/10262 |
| | | | 60/605.2 |
| 2017/0002773 A1 | 1/2017 | Segawa | |
| 2019/0264710 A1* | 8/2019 | Mohtar | F04D 29/464 |
| 2019/0271329 A1* | 9/2019 | Mohtar | F04D 29/464 |

FOREIGN PATENT DOCUMENTS

| | | | | |
|---|---|---|---|---|
| DE | 102019200471 A1 * | 7/2020 | | F02M 26/06 |
| DE | 102019200472 A1 * | 7/2020 | | F02M 26/06 |
| DE | 102019200473 A1 * | 7/2020 | | F02M 26/06 |
| DE | 102019200476 A1 * | 7/2020 | | F04D 29/4213 |
| EP | 2423496 A1 * | 2/2012 | | F02M 35/022 |
| JP | 60085223 A * | 5/1985 | | F02B 31/06 |
| JP | 2009108716 A * | 5/2009 | | |
| JP | 2010090806 A * | 4/2010 | | |
| JP | 2011027033 A | 2/2011 | | |
| JP | 2011222325 A | 11/2011 | | |
| JP | 2013238143 A | 11/2013 | | |
| JP | 2012107551 B2 | 5/2015 | | |
| JP | 2016094840 A * | 5/2016 | | |
| JP | 6370147 B2 | 8/2018 | | |
| WO | 2008129076 A1 | 10/2008 | | |

* cited by examiner

METHODS AND SYSTEMS FOR MITIGATING CONDENSATE FORMATION

CROSS REFERENCE TO RELATED APPLICATION

The present application claims priority to German patent application No. 102019200472.5, filed on Jan. 16, 2019, and German patent application No. 102019200473.3, filed on Jan. 16, 2019, and German patent application No. 102019200476.8, filed on Jan. 16, 2019, and German patent application No. 102019200469.5, filed on Jan. 16, 2019, and German patent application No. 102019200471.7, filed on Jan. 16, 2019. The entire contents of the above-listed applications are hereby incorporated by reference for all purposes.

FIELD

The present description relates generally to a flow channel, in particular for use in connection with an exhaust gas return flow channel and a compressor. The disclosure further relates to a compressor, a turbocharger, an exhaust gas return arrangement, a method for operating an exhaust gas return arrangement and a motor vehicle.

BACKGROUND/SUMMARY

In order to achieve emission limit values for exhaust gases, an exhaust gas return is generally carried out, in particular together with various exhaust gas post-processing methods, for example, using lean NOx traps and catalytic convertors for selective catalytic reduction. In this instance, the high specific humidity in the exhaust gas may lead to condensate being formed during the cooling of the exhaust gas. In particular, in connection with applications which have a low-pressure exhaust gas return, there is a likelihood of condensate reaching the compressor or compactor. In this instance, the effect of condensate drops on the compressor blades can lead to degradation of the compressor wheel as a result of shearing forces.

The mitigation of condensate formation or discharge of condensate from returned exhaust gas is therefore significant and at the same time represents a challenge. Yanagida et al. tech in United States Application No. 2011/011084 A1 that upstream of a compressor a turbulence generator and a recess for discharging foreign bodies may be used to decrease condensate. Bolda and Talmon-Gros teach a similar concept in United States Application No. 2010/0205949 A1, where a turbulence generator for separating condensate is provided upstream of a compressor.

In one example, condensate may be mitigated by an advantageous flow channel for use together with an exhaust gas return and for arrangement upstream of a compressor, which in particular removes and discharges condensate from the gas which is intended to be supplied to the compressor, that is to say, for example, the returned exhaust gas, the charge air or an exhaust gas/air admixture. Other objectives involve providing an advantageous compressor, an advantageous turbocharger, an exhaust gas return arrangement, a method for operating an exhaust gas return arrangement and a motor vehicle.

The flow channel according to the disclosure comprises an inner surface, an inlet, and an outlet. In this instance, the inlet is configured for connection in technical flow terms to an exhaust gas return flow channel. The outlet is configured for connection in technical flow terms to an inlet of a compressor. The flow channel comprises a center axis. At least one vortex generator is arranged downstream of the inlet and upstream of the outlet. The at least one vortex generator can be displaced in a radial direction, that is to say, is configured to control or change the cross-section of the flow channel in the region of the inlet or the flow cross-section. On the outlet there is arranged a condensate collection device which extends along the periphery of the outlet and which is delimited radially outwardly by the inner surface of the flow channel and in an axial direction by a collection edge. The condensate collection device is connected in technical flow terms to a discharge or an outlet. The discharge is in other words configured to discharge fluid, in particular condensed water.

The discharge which is connected to the condensate collection device is preferably arranged at the geodetically lowest point thereof. The condensate collection device is configured in an edge-like or channel-like manner along the periphery of the flow channel and directs the condensed water to the discharge.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
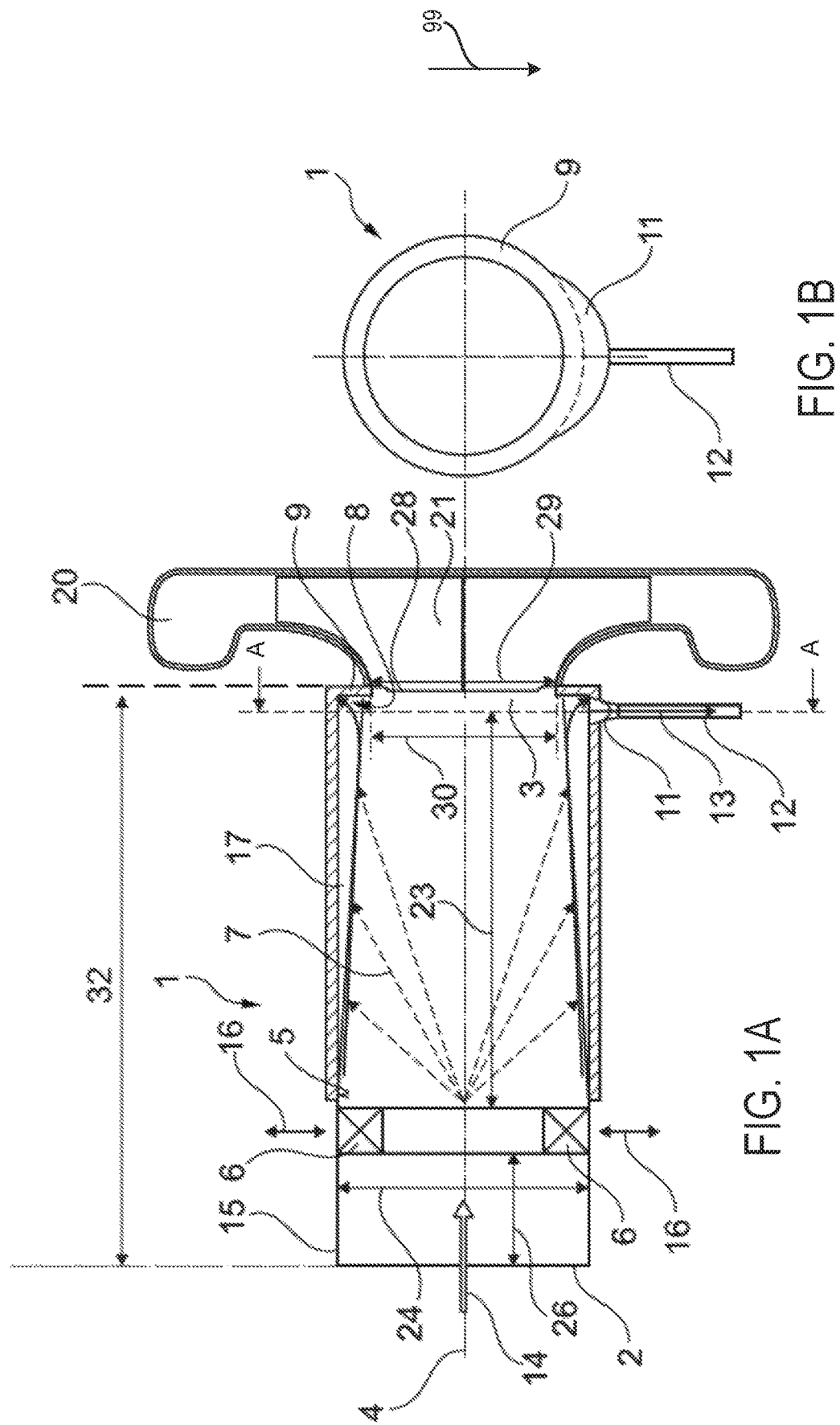
FIG. 1A shows a schematic longitudinal section of a flow channel according to the disclosure.
FIG. 1B shows a schematic cross-section along A-A of the flow channel.

The following description relates to systems and methods for a flow channel for decreasing condensate formation. The disclosure has the advantage that, as a result of the combination of at least one vortex generator having a collection device for condensed water which is arranged downstream thereof, the condensed water present in the gas which is directed through the flow channel, for example, returned exhaust gas or an exhaust gas/air admixture, can be effectively separated and discharged. Via the at least one vortex generator, the liquid contained in the gas is directed as a result of the centrifugal forces which occur as a result of the turbulence formation onto the inner surface of the flow channel. The condensate film which is formed on the inner surface of the flow channel and whose formation is promoted in particular by a temperature of the walls of the flow channel below the dew point for water, is subsequently collected in the condensate collection device and discharged via the discharge.

Another advantage of the construction according to the disclosure of the condensate collection device having a collection edge involves, as a result of corresponding sizing of the collection edge, in particular as a result of a high width of the collection edge, the separation length being shortened and consequently the flow channel with consistent functionality with regard to the separation of condensate being able to be constructed to be shorter in an axial direction. This is particularly advantageous with regard to efficient use of structural space.

In some examples, the at least one vortex generator can be displaced in a radial direction into a position in which it terminates with the inner surface of the flow channel. This variant has the advantage that the vortex generator can be used depending on the operating conditions, on the one hand, in order to produce turbulence, but, on the other hand, if it is not desired to be used, the flow through the flow channel is not impeded. That is to say, the vortex generator may, for example, in the case of returned exhaust gas, be pushed radially into the flow channel, wherein turbulence is produced via the vortex generator (swirl generator) which has guide vanes for this purpose. The resulting centrifugal force brings about the transport of the condensate droplets toward the outer wall and further into the annular channel. If no exhaust gas is returned, that is to say, for example, only charge air is directed through the flow channel, the at least one vortex generator can be pushed out of the flow channel in a radial direction so that the flow cross-section of the flow channel is not reduced. It is particularly advantageous in this instance for the vortex generator to terminate in such a "parking position" with the inner surface of the flow channel since in this instance an undesirable influence on the flow characteristics by a potential recess in the inner surface of the flow channel is prevented. The present disclosure is consequently also advantageous with regard to a reduction of the fuel consumption and the pollutant emissions.

In another example, additionally or alternatively, the condensate collection device may comprise a condensate collector or a condensate collection vessel, for example, in the form of a radial recess in the condensate collection device for collecting condensate, which is connected to the discharge. This has the advantage that large quantities of condensate can also be efficiently discharged through the discharge.

Advantageously, the flow channel comprises at least one wall which is constructed to be coolable. For example, at least one wall of the flow channel may be connected to a cooling device, for example, a heat exchanger. In this instance, preferably the entire wall and consequently also the inner surface of the flow channel may be constructed to be coolable and may as a result of the cooling promote the formation of condensate on the inner surface of the flow channel. That is to say, the at least one wall may be configured to be in thermal communication with the heat exchanger such that a temperature of the at least one wall may be adjusted.

The at least one turbulence generator may be constructed in the form of a ring. Such an embodiment promotes an efficient turbulence formation over the entire flow cross-section.

Figure 2:
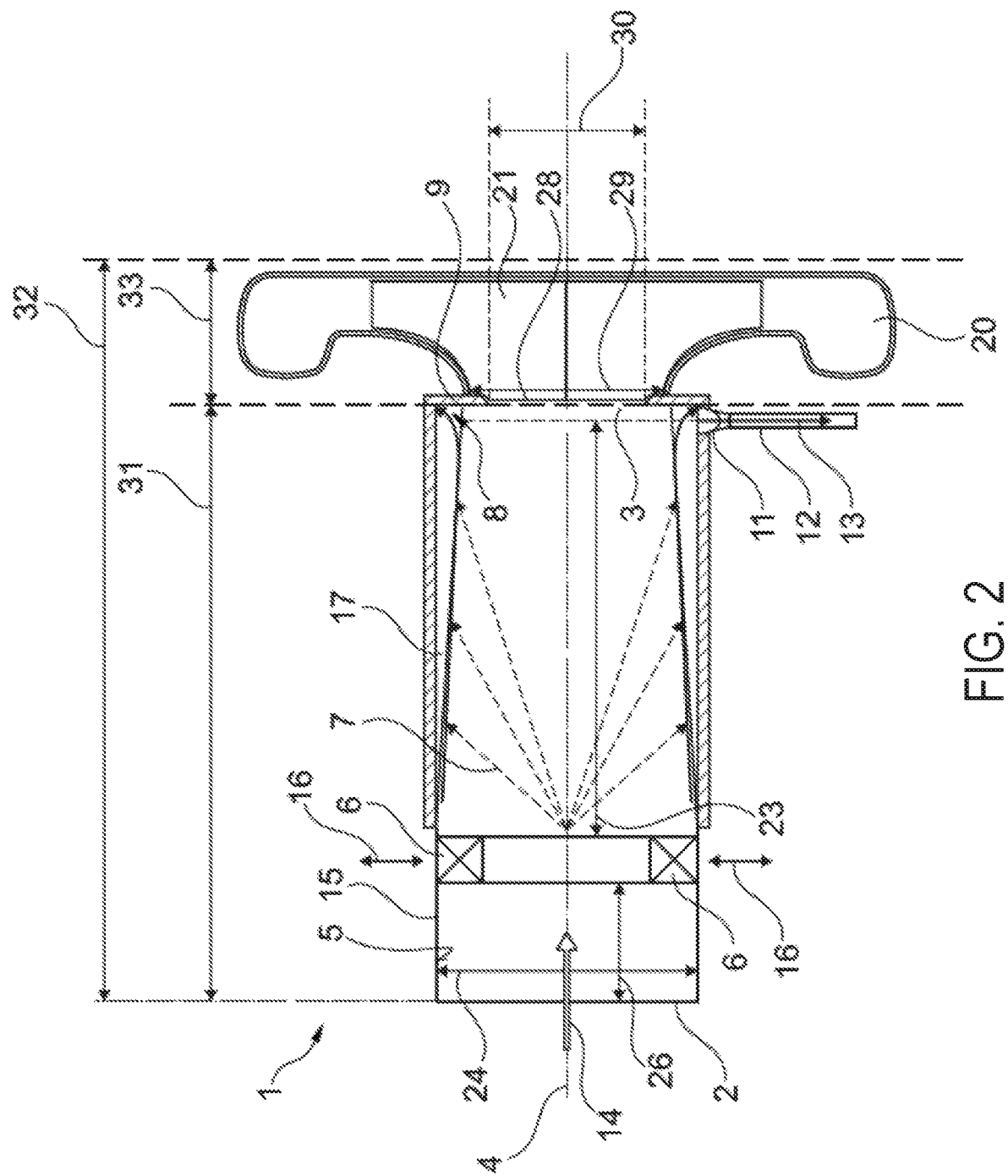
FIG. 2 shows a schematic longitudinal section of a second embodiment of a flow channel.
Figure 3A:
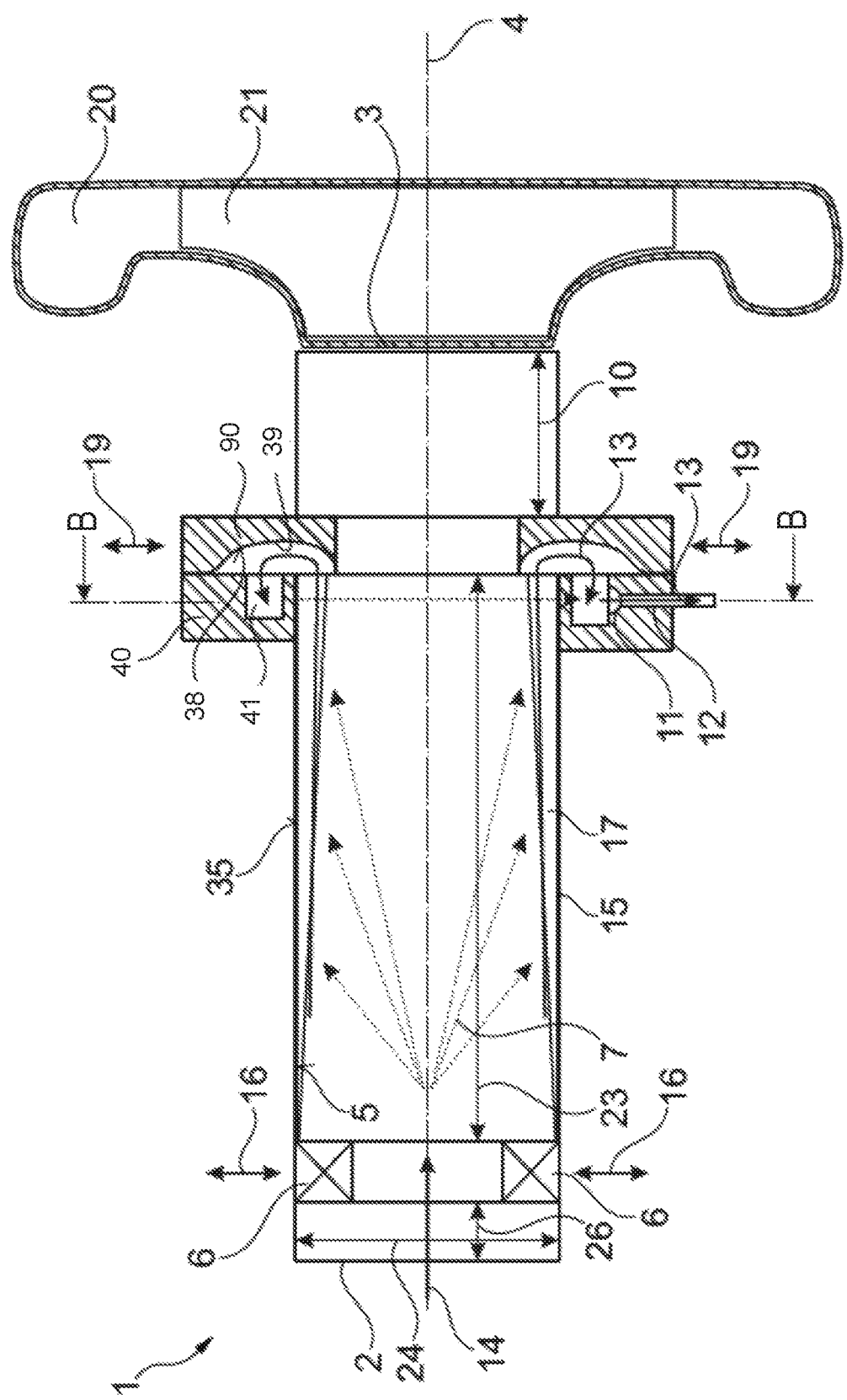
FIG. 3A shows a third embodiment of the flow channel.
Figure 3B:
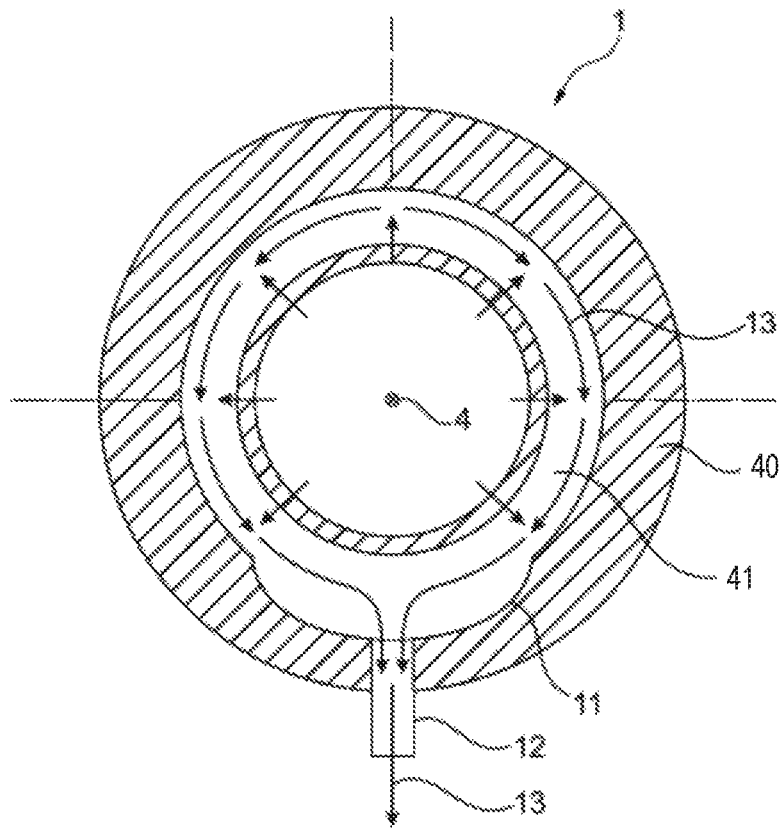
FIG. 3B illustrates a cross-section of the third embodiment along cutting plane B-B.
Figure 4:
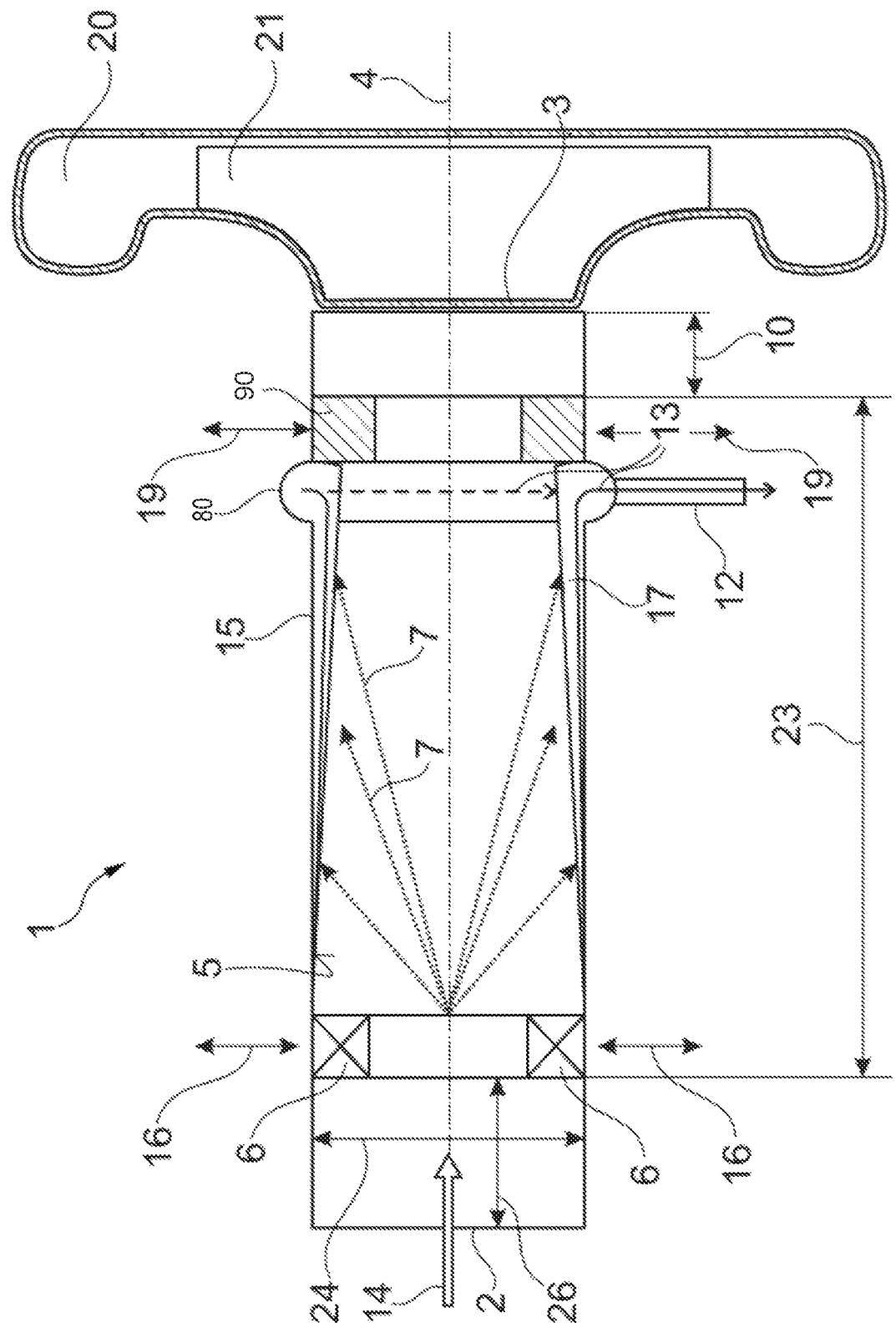
FIG. 4 illustrates a fourth embodiment of the flow channel.
Figures 5A, 5B:
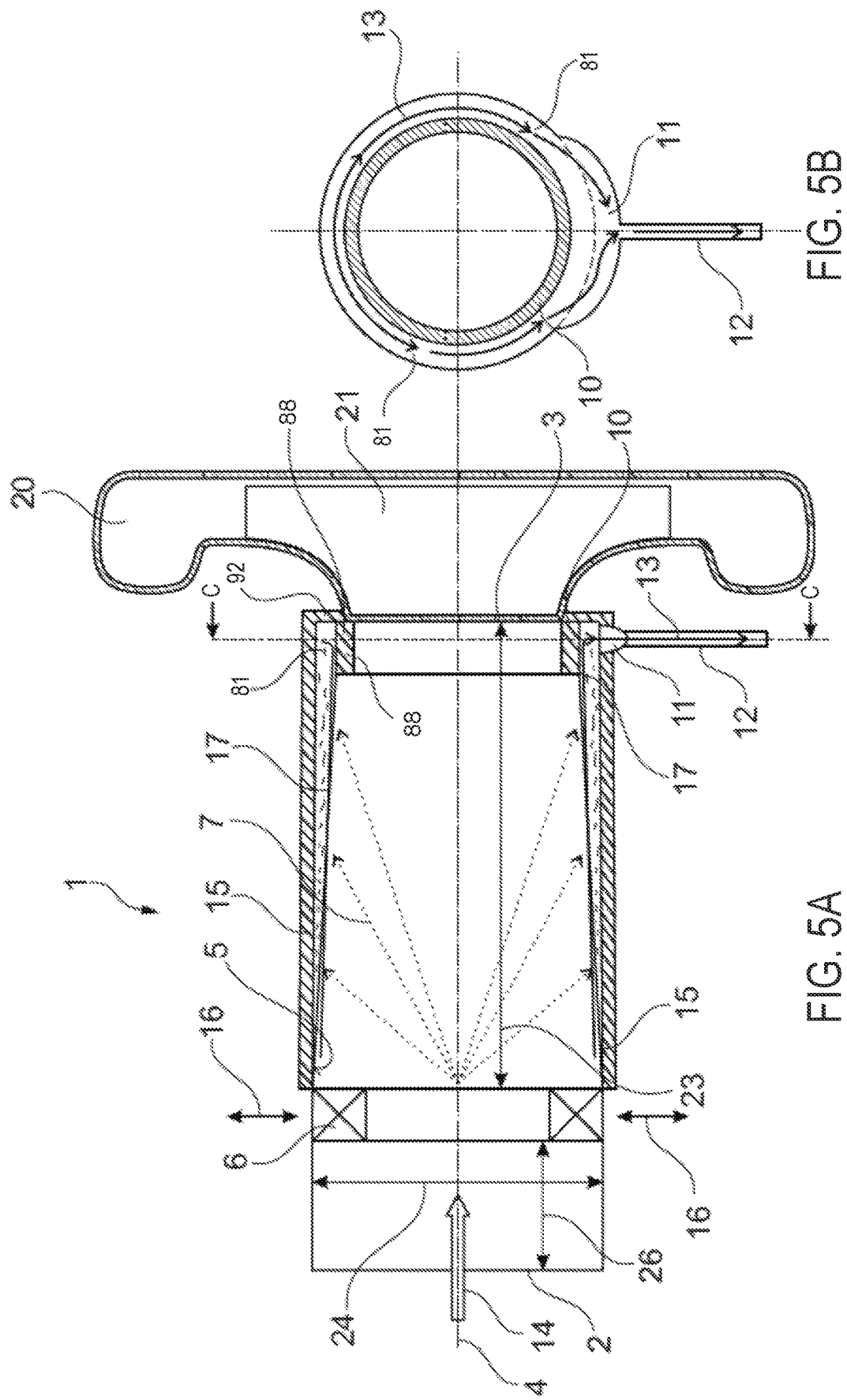
FIG. 5A illustrates a fifth embodiment of the flow channel.
FIG. 5B illustrates a cross-section of the fourth embodiment along cutting plane C-C.
Figure 6:
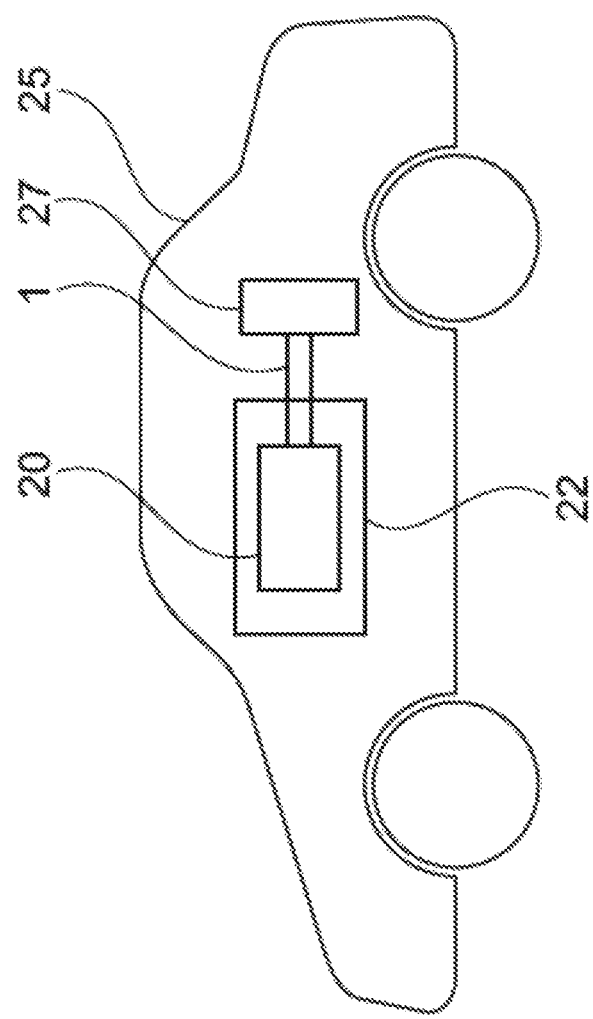
FIG. 6 is a schematic motor vehicle.
Figure 7:
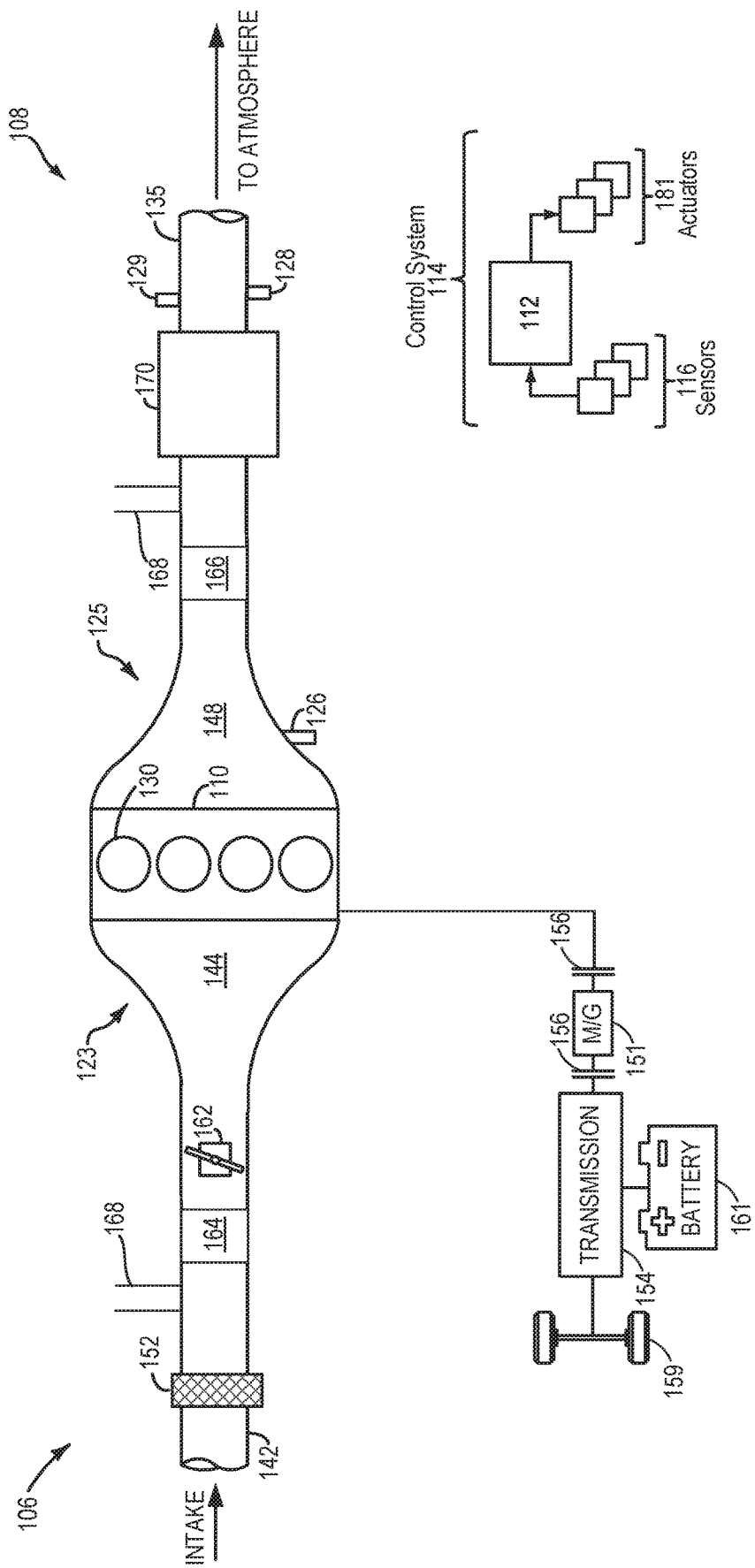
FIG. 7 shows an engine of a hybrid vehicle.
Figure 8:
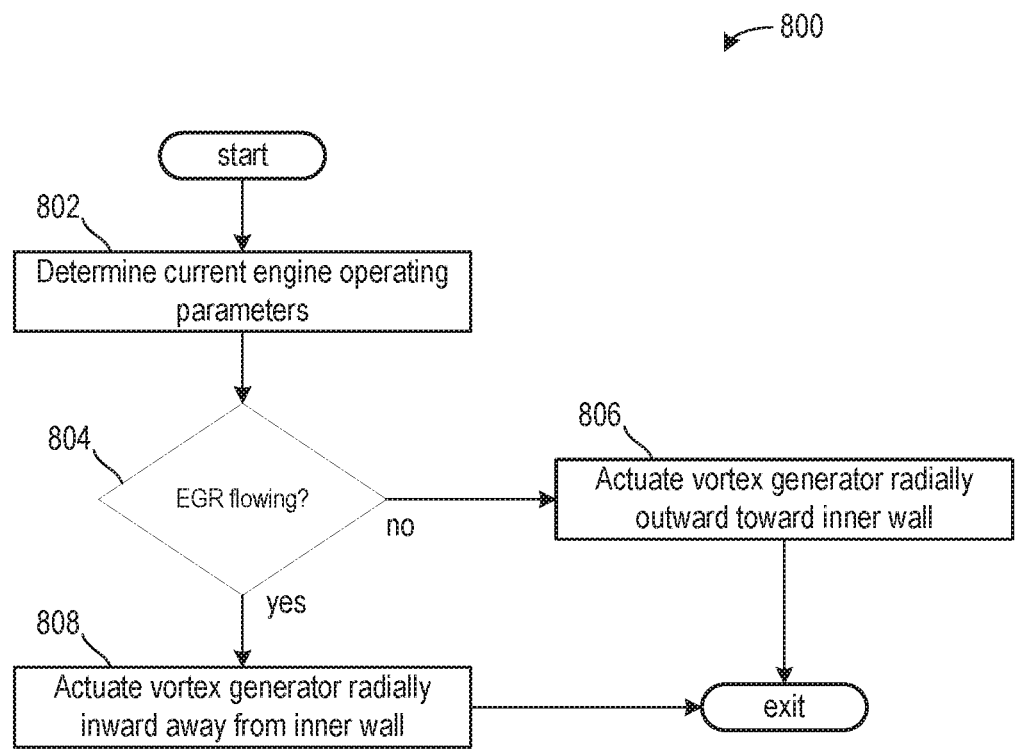
FIG. 8 shows a method for actuating the vortex generator.

FIG. 1A illustrates a schematic longitudinal section of a flow channel according to the disclosure. FIG. 1B illustrates a schematic cross-section along A-A of the flow channel. FIG. 2 illustrates a schematic longitudinal section of a second embodiment of a flow channel. FIG. 3A shows a third embodiment of the flow channel. FIG. 3B illustrates a cross-section of the third embodiment along cutting plane B-B. FIG. 4 illustrates a fourth embodiment of the flow channel. FIG. 5A illustrates a fifth embodiment of the flow channel. FIG. 5B illustrates a cross-section of the fourth embodiment along cutting plane C-C. and FIG. 6 is a schematic motor vehicle. FIG. 7 shows an engine of a hybrid vehicle. FIG. 8 illustrates a method for actuating the vortex generator.

The flow channel may have an inner diameter and a length, wherein the length is at least double the inner diameter. Preferably, the at least one vortex generator is arranged with a spacing in an axial direction from the condensate collection device which is at least twice as large as the inner diameter of the flow channel. With a clear inner diameter of the compressor inlet of 50 mm, for example, an inner diameter of the vortex generator of 30 mm is advantageous. As a result of the guide vanes located in this ring, the length thereof in a flow direction may, for example, be from 5 to 15 mm.

In another variant, the inlet of the flow channel may comprise a three-way exhaust gas return valve and/or a low-pressure exhaust gas return combination valve. Alternatively, the inlet may be connected in technical flow terms to a three-way exhaust gas return valve and/or a low-pressure exhaust gas return combination valve. In this instance, the control of the three-way exhaust gas return valve or the low-pressure exhaust gas return combination valve may be connected in technical control terms to a control of the radial position of the vortex generator. It is thus possible, for example, for the radial position of the at least one vortex generator to be controlled depending on the valve position.

As a result of the present disclosure, the risk of damage to a compressor arranged downstream of the flow channel is at least reduced. In particular, condensate formed in connection with a low-pressure exhaust gas return can, on the one hand, by a cooling of the returned exhaust gas via a lower temperature of the supplied and added charge air or, on the other hand, via the contact with colder components of the flow channels used, be separated and subsequently discharged by the vortex generators by means of active centrifugal forces. In order to discharge a maximum quantity of condensate, the flow channel can be individually sized, in particular also with respect to the position and size of the at least one vortex generator and the condensate collection device and the discharge. As a result of the present disclosure, the use of low-pressure exhaust gas return is further made accessible to a wider application range. Furthermore, the closure limit (choke limit) of a turbocharger which is arranged downstream of the flow channel can be expanded.

The compressor according to the disclosure comprises an inlet, at which an above-described flow channel according to the disclosure is arranged. Advantageously, the inlet of the compressor has an inner diameter and the outlet of the flow channel has an inner diameter which is determined by the collection edge and which is smaller than the inner diameter of the inlet of the compressor. As a result of such an embodiment, the compressor is protected in an optimum manner from undesirable penetration of condensed water, wherein at the same time the separation length and consequently also the length of the flow channel are shortened.

The turbocharger according to the disclosure comprises an above-described compressor according to the disclosure. The compressor according to the disclosure and the turbocharger according to the disclosure have the advantages already mentioned above. They can also be used in particular in connection with low-pressure exhaust gas return with a high level of moisture or a low temperature of the returned exhaust gas.

The exhaust gas return arrangement according to the disclosure comprises an outlet at which an above-described flow channel according to the disclosure is arranged. Preferably, the exhaust gas return arrangement is configured as a low-pressure exhaust gas return arrangement. The exhaust gas return arrangement according to the disclosure has the advantages already mentioned above. Furthermore, the exhaust gas return arrangement according to the disclosure may comprise an above-described compressor and/or an above-described turbocharger.

The method according to the disclosure for operating an above-described exhaust gas return arrangement comprises the following steps: if exhaust gas is returned, the at least one vortex generator is displaced inward in a radial direction into the flow channel so that the vortex generator protrudes into the flow channel. If no exhaust gas is returned, the at least one vortex generator is displaced outward in a radial direction at least as far as the inner surface of the flow channel, that is to say, so that the vortex generator at least does not protrude into the flow channel. Advantageously, if no exhaust gas is returned, the at least one vortex generator is displaced outward in a radial direction so that it terminates with the inner surface of the flow channel. The method according to the disclosure has the advantages already mentioned above. It enables in particular a use of the vortex generator adapted to the respective operating situation in connection with the discharge of the condensate formed.

In one example, a second embodiment of the disclosure comprises where the flow channel according to the disclosure comprises an inner surface, an outer surface, an inlet, and an outlet. The inlet is configured for fluidic connection to an exhaust gas recirculation flow channel. The outlet is configured for fluidic connection to an inlet of a compressor. The flow channel comprises a central axis. At least one vortex generator is arranged downstream of the inlet and upstream of the outlet. The at least one vortex generator is displaceable in the radial direction, i.e. in other words is configured to control or change the cross-section of the flow channel in the region of the inlet or the flow cross-section.

A droplet separator which is displaceable in the radial direction is arranged downstream of the at least one vortex generator and upstream of the outlet. The droplet separator is in particular displaceable into the flow channel. The droplet separator comprises a side pointing in the direction of the inlet. An annular depression running along the circumference of the flow channel for receiving or collecting condensation fluid or water is present at the side pointing in the direction of the inlet. Moreover, a component which adjoins the droplet separator in the direction of the inlet and which is preferably configured to be annular is arranged on the outer surface of the flow channel, which component comprises an annular depression which runs along the circumference of the flow channel and is fluidically connected to the annular depression of the droplet separator. The annular depression of the component which adjoins the droplet separator is fluidically connected to an outflow.

The droplet separator can be configured, for example, in the form of a droplet blade or an edge which runs in the circumferential direction or a barrier which runs in the circumferential direction. The droplet separator can, for example, be arranged at a distance which is smaller than half the inner diameter of the flow channel from the outlet.

The outflow connected to the annular depression of the component arranged on the outer surface is preferably arranged at its geodetically lowest point. The annular depression is configured in a channel-like manner along the circumference of the flow channel and conducts the condensation water to the outflow.

The disclosure has the advantage that, as a result of the combination of at least one vortex generator with a collecting device for condensation water arranged downstream thereof, the condensation water present in the gas conducted through the flow channel, for example, recirculated exhaust gas or an exhaust gas/air mixture, is effectively separated and discharged. The fluid contained in the gas is conducted by the centrifugal forces which occur as a result of the vortex formation to the inner surface of the flow channel by means of the at least one vortex generator. The condensation film which forms on the inner surface of the flow channel, the formation of which is promoted in particular by a temperature of the walls of the flow channel below the dew point for water, is subsequently collected in the annular depression and discharged via the outflow.

A compressor arranged downstream is protected from the influence of condensation water and thus extends its life span via the flow channel according to the disclosure.

In some examples, the at least one vortex generator and/or the droplet generator are displaceable in the radial direction into a position in which they terminate with the inner surface of the flow channel. This variant has the advantage that the vortex generator and/or the droplet separator can be used, depending on the operating conditions, on one hand, to generate vortices and to separate condensate, on the other hand, however, if their use is not necessary, the flow through the flow channel is not hindered. In other words, the vortex generator and/or the droplet separator can, for example, in the case of recirculated exhaust gas, be pushed radially into the flow channel, wherein vortices are generated by the vortex generator (swirl generator), which has guide blades for this purpose. The resultant centrifugal force brings about the transport of the condensate droplets to the outer wall and further into the annular channel. If no exhaust gas is recirculated, i.e., for example, only charge air is conducted through the flow channel, the at least one vortex generator and/or the drop separator can be pushed out of the flow channel in the radial direction so that the flow cross-section of the flow channel is not reduced. It is particularly advantageous if the vortex generator and/or the drop separator in such a "parking position" terminate with the inner surface of the flow channel since in this case an undesirable influencing of the flow characteristics by a possible depression in the inner surface of the flow channel is prevented. The present disclosure is thus also advantageous in terms of a reduction in fuel consumption and pollutant emissions.

In a further variant, the annular depression of the component arranged on the outer surface can comprise a condensate collector or a condensate-collecting bowl, for example, in the form of a further depression in the annular depression for collecting condensate, which recess is connected to the outflow. This has the advantage that even large quantities of condensate can be discharged efficiently by the outflow.

The flow channel advantageously comprises at least one wall which is configured so as to be capable of being cooled. For example, at least one wall of the flow channel can be connected to a cooling device, e.g. a heat exchanger. The entire wall and thus also the inner surface of the flow channel can preferably be configured so as to be capable of being cooled and the formation of condensate on the inner surface of the flow channel can be promoted by the cooling.

The at least one vortex generator can be configured in the form of a ring. Such a configuration promotes efficient vortex formation across the entire flow cross-section. The droplet separator is also preferably configured to be annular.

The flow channel can have an inner diameter and a length, wherein the length is at least twice the inner diameter. The at least one vortex generator is preferably arranged at a distance in the axial direction from the droplet separator which is twice as large as the inner diameter of the flow channel. In the case of a clear inner diameter of the compressor inlet of 50 mm, for example, an inner diameter of the vortex generator of 30 mm is advantageous. As a result of the guide blades located in this ring, its length in the flow direction can be, for example, 5 to 15 mm.

In a further variant, the inlet of the flow channel can comprise a three-way exhaust gas recirculation valve and/or a low-pressure exhaust gas recirculation combination valve. Alternatively to this, the inlet can be fluidically connected to a three-way exhaust gas recirculation valve and/or a low-pressure exhaust gas recirculation combination valve. The control of the three-way exhaust gas recirculation valve or of the low-pressure exhaust gas recirculation combination valve can be connected in terms of control technology to a control of the radial position of the vortex generator and/or of the droplet separator. The radial position of the at least one vortex generator and of the droplet separator can therefore be controlled, for example, as a function of the valve position.

As a result of the present disclosure, the risk of degradation to a compressor arranged downstream of the flow channel is at least reduced. In particular, condensate formed in conjunction with low-pressure exhaust gas recirculation can be separated and subsequently discharged by, on one hand, a cooling of the recirculated exhaust gas by a lower temperature of the supplied and added charge air or, on the other hand, by contact with colder parts of the flow channels used by the vortex generators by means of acting centrifugal forces. The flow channel can be individually dimensioned in order to discharge a maximum quantity of condensate, in particular also in relation to the position and size of the at least one vortex generator, the annular depression and the drop separator, and of the outflow. As a result of the present disclosure, a wider field of application is furthermore made available for the use of low-pressure exhaust gas recirculation. The choke limit of a turbocharger arranged downstream of the flow channel can furthermore be extended.

The compressor according to the disclosure comprises an inlet on which a flow channel according to the disclosure and described above is arranged. The turbocharger according to the disclosure comprises a compressor according to the disclosure and described above. The compressor according to the disclosure and turbocharger according to the disclosure have the advantages already stated above. They can be used in particular in conjunction with low-pressure exhaust gas recirculation even in the case of high humidity or a low temperature of the recirculated exhaust gas.

The exhaust gas recirculation arrangement according to the disclosure comprises an outlet on which a flow channel according to the disclosure and described above is arranged. The exhaust gas recirculation arrangement is preferably configured as a low-pressure exhaust gas recirculation arrangement. The exhaust gas recirculation arrangement according to the disclosure has the advantages already cited above. Moreover, the exhaust gas recirculation arrangement according to the disclosure can comprise a compressor described above and/or a turbocharger described above.

The method according to the disclosure for operating an exhaust gas recirculation arrangement described above comprises the following steps: if exhaust gas is recirculated, the at least one vortex generator and the droplet separator are displaced in the radial direction inward into the flow channel so that the vortex generator and the droplet separator project into the flow channel. If no exhaust gas is recirculated, the at least one vortex generator and the droplet separator are displaced in the radial direction outward at least to the inner surface of the flow channel, i.e. so that the vortex generator and the droplet separator at least do not project into the flow channel. If no exhaust gas is recirculated, the at least one vortex generator and the droplet separator are advantageously displaced in the radial direction outward so that they terminate with the inner surface of the flow channel. The method according to the disclosure has the advantages already mentioned above. It enables in particular a use of the vortex generator and of the droplet separator adapted to the respective operating situation in combination with the discharge of the condensate formed.

The flow channel 1 according to a first embodiment of the disclosure shown in FIGS. 1A, 1B, and 2 comprises an inlet 2, an outlet 3, and a center axis 4. In the variant shown, the center axis 4 is at the same time the center axis of the inlet 2 and the outlet 3. Alternatively to the variant shown, the center axes of the inlet 2 and the outlet 3 may also differ from each other, the flow channel 1 may thus also have one or more curves. The flow channel 1 according to the disclosure additionally comprises an inner surface 5 and an outer wall 15.

At least one vortex generator 6 is arranged downstream of the inlet 2 and upstream of the outlet 3. The at least one vortex generator 6 may, for example, be arranged at the inlet 2 directly or with spacing 26 which is smaller than a third of the length of the flow channel 1, in one example. The at least one vortex generator 6 can be displaced in a radial direction. This is indicated by arrows 16. The at least one vortex generator 6 may thus be pushed radially inward into the flow channel 1 so that it protrudes inward in a radial direction over the inner surface 5 into the flow channel. Furthermore, the at least one vortex generator 6 may be displaced outward in a radial direction 16 at least as far as the inner surface 5 of the flow channel 1, in particular until it terminates at least with the inner surface 5, that is to say, it does not protrude into the flow channel 1. In this way, the vortex generator 6 may protrude further into the flow channel 1 than the inner surface 5.

Via the at least one vortex generator 6, occurrences of turbulence are formed in a gas flowing through the flow channel 1, wherein liquid drops contained in the gas, for example, in a returned exhaust gas, as a result of the centrifugal forces acting on them as a result of the turbulence formation are pressed radially outward and consequently directed to the inner surface 5. This is indicated by arrows 7. The flow direction of the gas flowing through the inlet 2 into the flow channel 1 is designated 14. The condensate directed by the centrifugal forces onto the inner surface 5 forms a condensate film 17 and subsequently flows as a result of the flow in the flow channel 1 in the direction of the outlet 3.

Preferably, the outer wall 15 of the flow channel 1 may be cooled, that is, for example, configured with a cooling device. The condensate formation is thereby promoted and a more efficient separation and discharge of the condensate or the liquid is achieved.

At the outlet 3, a condensate collection device 8 which extends along the periphery of the flow channel 1 is arranged. The condensate collection device 8 is delimited radially by the inner surface 5 of the flow channel 1 and in an axial direction by a collection edge 9, that is to say, it is thus constructed in the variant shown in the form of an edge. The collection edge 9 and the condensate collection device 8 may comprise an annular shape and extend around an entirety of the inner surface 5. The collection edge 9 may extend radially inward by an amount equal to or less than a radially inward extension of the vortex generator 6.

In the variant shown in FIG. 1A, the at least one vortex generator 6 is arranged with a spacing 23 from the condensate collection device 8. Preferably, the spacing 23 is greater than double the inner diameter 24 of the flow channel 1.

Furthermore, the condensate collection device 8 is connected in technical flow terms to a discharge 12. In addition, there may be arranged upstream of the discharge 12 a condensate collector 11 which improves the collection and discharge of the condensate. The flow direction of the condensate flowing through the condensate collection device 8, the condensate collector 11 and the discharge 12 is indicated with arrows 13. FIG. 1B is a schematic cross-section along A-A of the flow channel 1 according to the disclosure shown in FIG. 1A. In this instance, the condensate collector 11 is arranged in the geodetically lowest region of the condensate collection device 8, that is to say, in the 6 o'clock region.

In the variant shown in FIG. 1A, the flow channel 1 according to the disclosure is connected in technical flow terms at the outlet 3 thereof to a compressor 20, for example, a compressor 20 of a turbocharger 22. The compressor 20 comprises an inlet 28 having an inner diameter 29 and a compressor wheel 21. As a result of the discharge of the condensate contained in particular in an exhaust gas flow, via the flow channel 1 according to the disclosure the compressor wheel 21 of the compressor 20 is protected from damage by condensed water.

The inner diameter 30 of the outlet 23 of the flow channel 1 is formed by the collection edge 9. In the variant shown in FIG. 1A, the inner diameter 30 of the outlet 3 of the flow channel is equal to the inner diameter 29 of the inlet 28 of the compressor 20. Therefore, the flow cross-section of the compressor inlet is completely used. The overall length of the flow channel 1 shown in FIG. 1A is designated 32.

Thus, the example illustrated in FIGS. 1A and 1B illustrate an adjustable vortex generator 6 arranged within an upstream portion of a flow channel 1, which may be interchangeably referred to as a compressor inlet passage. The inner surface 5 may allow condensate to impinge thereto and form a condensate layer, wherein the condensate layer is spaced away from intake gases flowing along the center axis 4 of the flow channel 1. The vortex generator 6 may promote condensate formed due to exhaust gas recirculation (EGR) flow to flow radially outward to the inner surface 5 due to a reduction in a cross-sectional flow through area of the flow channel 1 caused by a radially inward protrusion of the vortex generator 6. During conditions where EGR is not flowing, the vortex generator 6 may be retracted. That is to say, the vortex generator 6 may be actuated radially outward toward the inner surface 5 so that the cross-sectional area of the flow channel 1 is less affected by the vortex generator 6 than during conditions where EGR is flowing. In one example, the vortex generator is flush with the inner surface 5 when it is moved radially outward.

A condensate collection device 8 may be arranged downstream of the vortex generator 6, between the vortex generator 6 and the compressor 20. The condensate collection device 8 may comprise one or more features shaped to promote the condensate layer formed on the inner surface 5 to flow to a condensate collector 11 and ultimately out of the flow channel 1 via a discharge 12. The condensate collector 11 may deviate from a circular shape of the flow channel 1 as shown in the cross-section in FIG. 1B. The condensate collector 11 may comprise a lobe shape and is arranged in a lowest portion of the flow channel 1 with respect to a direction of gravity illustrated via arrow 99. Condensate collected in the condensate collector 11 may flow through the discharge in a self-regulating manner due to the amount of condensate collected exceeding a threshold amount and/or due to a pressure of the flow channel 1 forcing the condensate through the discharge 12. Additionally or alternatively, a valve may be arranged in the discharge 12 and adjusted to allow condensate to flow therethrough. The condensate may be directed to an ambient atmosphere or directed to a water reservoir or other type of water holding container. The embodiments disclosed herein illustrate various embodiments of the condensate collection device and a condensate capturing feature that promote the flow of condensate from the inner surface 5 to the condensate collector 11.

In the variant of the first embodiment illustrated in FIG. 2, the inner diameter 30 of the outlet 3 of the flow channel is less than the inner diameter 29 of the inlet 28 of the compressor 20. Although the flow cross-section of the compressor inlet is consequently not completely used, instead the separation length and consequently the overall length 31 are reduced. The difference of the overall lengths 31 and 32 is indicated by an arrow 33. The shortening of the overall length is particularly advantageous from a spatial constraint viewpoint.

Flow channel 1 according to a second embodiment of the disclosure and shown in FIGS. 3A and 3B comprises the inlet 2, the outlet 3, and the central axis 4. As such, components previously introduced may be similarly numbered in this figure and in subsequent figures. In the second embodiment, central axis 4 is simultaneously the central axis of inlet 2 and of outlet 3. As an alternative to the second embodiment, the central axes of inlet 2 and outlet 3 can also deviate from one another, flow channel 1 can therefore also have one or more bends. Flow channel 1 according to the disclosure furthermore comprises an inner surface 5, an outer surface 35 and an outer wall 15.

At least one vortex generator 6 is arranged downstream of inlet 2 and upstream of outlet 3. The at least one vortex generator 6 can be arranged, for example, directly at inlet 2 or at a distance 26 which is smaller than a third of the length of flow channel 1. The at least one vortex generator 6 is displaceable in the radial direction. This is indicated by arrows 16. The at least one vortex generator 6 can therefore be pushed radially inward into flow channel 1 so that it projects in the radial direction inward via inner surface 5 into the flow channel. The at least one vortex generator 6 can furthermore be displaced in radial direction 16 outward at least to inner surface 5 of flow channel 1 in particular so far that it terminates at least with inner surface 5, i.e. does not project into flow channel 1.

Vortices are formed via the at least one vortex generator 6 in a gas which flows through flow channel 1, wherein droplets of fluid contained in the gas, for example, in a recirculated exhaust gas, are pushed by the centrifugal forces acting on them as a result of the vortex formation radially to the outside and thus conducted to inner surface 5. This is indicated by arrows 7. The flow direction of the gas which flows through inlet 2 into flow channel 1 is marked by reference number 14. The condensate conducted by the centrifugal forces to inner surface 5 forms a condensate film 17 and subsequently flows in the direction of outlet 3 as a result of the flow in flow channel 1.

Outer wall 15 of flow channel 1 can preferably be cooled, therefore, configured, for example, with a cooling apparatus. As a result of this, the formation of condensate is promoted and more efficient separation and discharge of the condensate or the fluid are achieved.

A droplet separator 90 which is displaceable in the radial direction is arranged upstream of outlet 3 and downstream of the at least one vortex generator 6. Droplet separator 90 can be arranged, for example, directly at outlet 3 or at a distance 10 which is smaller than a third of the length of flow channel 1. Droplet separator 90 is displaceable in the radial direction. This is indicated by arrows 19. Droplet separator 90 can therefore be pushed radially inward into flow channel 1 so that it projects in the radial direction inward via inner surface 5 into flow channel 1. Droplet separator 90 can furthermore be displaced in radial direction 19 outward at least to inner surface 5 of flow channel 1 in particular so far that it terminates at least with inner surface 5, i.e. does not project into flow channel 1.

Droplet separator 90 comprises a side 38, which points in the direction of inlet 2, with an annular depression 39 for collecting condensation fluid. A component 40 which adjoins droplet separator 90 is arranged in the direction of inlet 2 on outer surface 35 of flow channel 1, which component 40 comprises an annular depression 41 which is fluidically connected to annular depression 39 to collect condensation fluid of droplet separator 90. Annular depression 41 of component 40 is furthermore fluidically connected to the discharge 12.

Annular depression 41 can additionally comprise a condensate collector 11 which improves the collection and discharge of the condensate. The flow direction of the condensate which flows through annular depression 41 and discharge 12 is marked by arrows 13.

In the variant shown in FIG. 3A, flow channel 1 according to the disclosure is fluidically connected at its outlet 3 to a compressor 20, for example, a compressor 20 of a turbocharger 22. Compressor 20 comprises a compressor wheel 21. As a result of the discharge of the condensate contained in an in particular exhaust gas flow via flow channel 1 according to the disclosure, compressor wheel 21 of compressor 20 is protected from damage by condensation water.

In the variant shown in FIG. 3A, the at least one vortex generator 6 is arranged at a distance 23 from droplet separator 90. Distance 23 is preferably greater than twice the inner diameter 24 of flow channel 1.

The flow channel 1 according to a third embodiment shown in FIG. 4 comprises the inlet 2, the outlet 3, and the center axis 4. In the variant shown, the center axis 4 is at the same time the center axis of the inlet 2 and the outlet 3. Alternatively to the variant shown, the center axes of the inlet 2 and the outlet 3 may also differ from each other, the flow channel 1 may thus also have one or more curves. The flow channel 1 according to the disclosure additionally comprises the inner surface 5 and the outer wall 15.

At least one vortex generator 6 is arranged downstream of the inlet 2 and upstream of the outlet 3. The at least one vortex generator 6 may, for example, be arranged directly at the inlet 2 or with spacing 26 which is smaller than a third of the length of the flow channel 1. The at least one vortex generator 6 can be displaced in a radial direction. This is indicated by arrows 16. The at least one vortex generator 6 may thus be pushed radially inward into the flow channel 1 so that it protrudes inward in a radial direction over the inner surface 5 into the flow channel. Furthermore, the at least one vortex generator 6 may be displaced outward in a radial direction 16 at least as far as the inner surface 5 of the flow channel 1, in particular until it terminates at least with the inner surface 5, that is to say, it does not protrude into the flow channel 1.

Via the at least one vortex generator 6, occurrences of turbulence are formed in a gas flowing through the flow channel 1, wherein liquid drops contained in the gas, for example, in a returned exhaust gas, as a result of the centrifugal forces acting on them as a result of the turbulence formation are pressed radially outward and consequently directed to the inner surface 5. This is indicated by arrows 7. The flow direction of the gas flowing through the inlet 2 into the flow channel 1 is designated 14. The condensate directed by the centrifugal forces onto the inner surface 5 forms a condensate film 17 and subsequently flows as a result of the flow in the flow channel 1 in the direction of the outlet 3.

Preferably, the outer wall 15 of the flow channel 1 may be cooled, that is, for example, configured with a cooling device. The condensate formation is thereby promoted and a more efficient separation and discharge of the condensate or the liquid is achieved.

Upstream of the outlet 3 and downstream of the at least one vortex generator 6, an annular recess 80 which extends along the periphery of the flow channel 1 is arranged in the inner surface 5 of the flow channel 1. The annular recess 80 is adjoined in the direction of the outlet 3 by a droplet separator 90 which can be displaced in a radial direction.

The droplet separator 90 may, for example, be arranged directly at the outlet 3 or with a distance 10 which is less than a third of the length of the flow channel 1. The droplet separator 90 can be displaced in a radial direction. This is indicated by arrows 19. The droplet separator 90 may thus be displaced radially inward into the flow channel 1 so that it protrudes inward in a radial direction over the inner surface 5 into the flow channel 1. Furthermore, the droplet separator 90 can be displaced in a radial direction 19 outward at least as far as the inner surface 5 of the flow channel 1, in particular until it at least terminates with the inner surface 5, that is to say, it does not protrude into the flow channel 1.

Furthermore, the annular recess 80 is connected in technical flow terms to a discharge 12. In addition, there may be arranged upstream of the discharge 12 a condensate collector which is not shown in FIG. 4 and which improves the collection and discharge of the condensate. The flow direction of the condensate flowing through the collection channel 8 and the discharge 12 is indicated with arrows 13.

In the third embodiment shown in FIG. 4, the flow channel 1 according to the disclosure is connected in technical flow terms at the outlet 3 thereof to a compressor 20, for example, a compressor 20 of a turbocharger 22. The compressor 20 comprises a compressor wheel 21. As a result of the discharge of the condensate contained in particular in an exhaust gas flow, via the flow channel 1 according to the disclosure the compressor wheel 21 of the compressor 20 is protected from damage by condensed water.

In the variant shown in FIG. 4, the at least one vortex generator 6 is arranged with a spacing 23 from the droplet separator 90 or with a corresponding spacing from the annular recess 80. Preferably, the spacing 23 is greater than double the inner diameter 24 of the flow channel 1.

The flow channel 1 according to the fourth embodiment shown in FIGS. 5A and 5B comprises the inlet 2, the outlet 3, and the central axis 4. In the variant shown, the central axis 4 is simultaneously the central axis of the inlet 2 and the outlet 3. As an alternative to the variant shown, the central axes of the inlet 2 and the outlet 3 also differ from one another, so the flow channel 1 can also have one or more curvatures. The flow channel 1 according to the disclosure also comprises the inner surface 5 and the outer wall 15.

At least one vortex generator 6 is arranged downstream of the inlet 2 and upstream of the outlet 3. The at least one vortex generator 6 can, for example, be arranged directly at the inlet 2 or at the distance 26 that is less than a third of the length of the flow channel 1. The at least one vortex generator 6 is displaceable in the radial direction. This is indicated by arrows 16. The at least one vortex generator 6 can thus be pushed radially inwards into the flow channel 1, so that it projects inwards in a radial direction beyond the inner surface 5. Furthermore, the at least one vortex generator 6 can be displaced outward in the radial direction 16 at least as far as the inner surface 5 of the flow channel 1, in particular to the extent that it at least closes with the inner surface 5, that is to say does not protrude into the flow channel 1.

Via the at least one vortex generator 6, vortices are formed in a gas flowing through the flow channel 1, liquid drops contained in the gas, for example in a recirculated exhaust gas, being pressed radially outwards by the centrifugal forces acting on them as a result of the vortex formation and thus to the inner surface 5 be directed. This is indicated by arrows 7. The direction of flow of the gas flowing through the inlet 2 into the flow channel 1 is identified by the reference number 14. The condensate directed to the inner surface 5 by the centrifugal forces forms a condensate film 17 and then flows due to the flow in the flow channel 1 in the direction of the outlet 3.

The outer wall 15 of the flow channel 1 can preferably be cooled, that is to say, for example, it can be designed with a cooling device. This promotes the formation of condensate and more efficient separation and drainage of the condensate or the liquid is achieved.

Arranged upstream of the outlet 3 and downstream of the at least one vortex generator 6 is a gutter 81 running along the circumference of the flow channel 1, for example along the circumference of the outlet 3. The depth of the gutter 81 extends in the axial direction, for example in the direction of flow 14. The gutter 81 is delimited radially on the outside by the inner surface 5 of the flow channel. In the axial direction 4 or in the flow direction 14, the gutter 81 (e.g., a condensate collection device) is delimited by a catching edge 92 (e.g., a collection edge 9), which can be formed, for example, by part of the outer wall 15. Radially on the inside, the gutter 81 is delimited by an edge 88 which runs at a distance from the inner surface 5 in the circumferential direction of the flow channel 1 and which can be designed, for example, as a circumferential strip. Furthermore, the gutter 81 is fluidly connected to a discharge 12. A condensate collector 11, which improves the collection and removal of the condensate, is preferably additionally arranged upstream of the discharge 12. The direction of flow of the condensate flowing through the gutter 81, the condensate collector 11 and the discharge 12 is indicated by arrows 13.

In the variant shown in FIG. 5A, the flow channel 1 according to the disclosure is fluidically connected at its outlet 3 to a compressor 20, for example a compressor 20 of a turbocharger 22. The compressor 20 comprises a compressor wheel 21. By discharging the condensate contained in an exhaust gas stream in particular by means of the flow channel 1 according to the disclosure, the compressor wheel 21 of the compressor 20 is protected from damage by condensation water.

In the variant shown in FIG. 5A, the at least one vortex generator 6 is arranged at a distance 23 from the outlet 3 or at a distance from the gutter 81. The distance 23 is preferably greater than twice the inner diameter 24 of the flow channel 1. FIG. 5B illustrates a cross-section of the flow channel 1 taken along cutting plane C-C.

FIG. 6 schematically shows a motor vehicle 25 according to the disclosure. The motor vehicle 25 comprises a turbocharger 22 having a compressor 20 and an exhaust gas return arrangement 27. The exhaust gas return arrangement 27 and the compressor 20 are connected to each other in technical flow terms by means of a flow channel 1 according to the disclosure.

FIG. 7 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 further comprises a compressor 164 mechanically coupled to a turbine 166. An EGR passage 168 is configured to route exhaust gas from downstream of the turbine to a portion of the intake passage 142 upstream of the compressor 164. As such, the EGR passage 168 is a low-pressure EGR passage. An inlet of the compressor 164 may comprise one or more of the embodiments of the flow channel 1 described above with regards to FIGS. 1A, 3A, 4, and 5A.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

FIG. 8 shows a method 800 for actuating the vortex generator in response to EGR flow. Instructions for carrying out method 800 may be executed by a controller based on instructions stored on a memory of the controller and in conjunction with signals received from sensors of the engine system, such as the sensors described above with reference to FIG. 7. The controller may employ engine actuators of the engine system to adjust engine operation, according to the methods described below.

The method 800 begins at 802, which includes determining, estimating, and/or measuring one or more engine operating parameters. The engine operating parameters may include but are not limited to one or more of an engine speed, manifold pressure, throttle position, engine temperature, exhaust gas recirculation (EGR) flow rate, and an air/fuel ratio.

The method 800 may proceed to 804, which includes determining if EGR is flowing. In one example, EGR may be used to decrease combustion temperatures to mitigate production of unwanted combustion byproducts. If EGR is not flowing, then the method 800 proceeds to 806, which includes actuating the vortex generator radially outward toward the inner surface. As such, a cross-sectional flow through area of the flow channel may be increased. In one example, the vortex generator is actuated so that it is flush with the inner surface and does not perturb intake air flow through the flow channel.

If EGR is flowing, then the method 800 proceeds to 808, which includes actuating the vortex generator radially inward away from the inner surface. As such, the cross-sectional flow through area of the flow channel may be decreased. The vortex generator may perturb the intake air and EGR flow such that condensate therein may impinge onto the inner surface and collect via the condensate collection device, which may mitigate an amount of condensate flowing to a compressor. As such, condensate may not degrade the compressor blades.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, an intake passage of a compressor comprises a condensate collection device comprising a vortex generator which extends radially inward into the intake passage and decreases a cross-section thereof. The technical effect of the vortex generator is to disrupt an intake air flow toward the compressor and promote condensate layering along a radial surface of the intake passage, where a component of the condensate collection device may promote flow of the condensate layer into a discharge pathway away from the compressor.

As one embodiment, a flow channel having an inner surface, an inlet, and an outlet, wherein the inlet is configured for connection in technical flow terms to an exhaust gas return flow channel and the outlet is configured for connection in technical flow terms to an inlet of a compressor, characterized in that the flow channel comprises a center axis and at least one vortex generator is arranged downstream of the inlet and upstream of the outlet and can be displaced in a radial direction, and on the outlet there is arranged a condensate collection device which extends along the periphery of the outlet and which is delimited radially outwardly by the inner surface of the flow channel and in an axial direction by a collection edge, wherein the condensate collection device is connected in technical flow terms to a discharge.

A first example of the flow channel further comprises where the at least one vortex generator can be displaced in a radial direction into a position in which it terminates with the inner surface of the flow channel.

A second example of the flow channel, optionally including the first example, further includes where the condensate collection device comprises a condensate collector which is connected to the discharge.

A third example of the flow channel, optionally including one or more of the previous examples, further includes where the flow channel comprises at least one wall which is constructed to be coolable.

A fourth example of the flow channel, optionally including one or more of the previous examples, further includes where the at least one vortex generator is constructed in the form of a ring.

A fifth example of the flow channel, optionally including one or more of the previous examples, further includes where the at least one vortex generator is arranged with a spacing in an axial direction from the condensate collection device of at least double the inner diameter of the flow channel.

A sixth example of the flow channel, optionally including one or more of the previous examples, further includes where the inlet comprises a three-way exhaust gas return valve and/or a low-pressure exhaust gas return combination valve or the inlet is connected in technical flow terms to a three-way exhaust gas return valve and/or a low-pressure exhaust gas return combination valve.

A seventh example of the flow channel, optionally including one or more of the previous examples, further includes where the flow channel is arranged at an inlet of a compressor.

An eighth example of the flow channel, optionally including one or more of the previous examples, further includes where the inlet of the compressor has an inner diameter and the outlet of the flow channel has an inner diameter (30) which is determined by the collection edge and which is smaller than the inner diameter of the inlet of the compressor.

An example of the method for the flow channel comprises where if EGR is flowing displacement of the at least one vortex generator inward in a radial direction into the flow channel so that the vortex generator protrudes into the flow channel, if no EGR is flowing, displacement of the at least one vortex generator outward in a radial direction at least as far as the inner surface of the flow channel.

An embodiment of a flow channel with an inner surface, an outer surface, an inlet, and an outlet, wherein the inlet is configured for fluidic connection to an exhaust gas recirculation flow channel and the outlet is configured for fluidic connection to an inlet of a compressor, characterized in that the flow channel comprises a central axis and at least one vortex generator is arranged downstream of the inlet and upstream of the outlet, which vortex generator is displaceable in the radial direction, and a droplet separator which is displaceable in the radial direction is arranged upstream of the outlet and downstream of the at least one vortex generator, which droplet separator comprises, on a side pointing in the direction of the inlet, an annular depression running along the circumference of the flow channel for collecting condensation fluid, and in the direction of the inlet a component which adjoins the droplet separator is arranged on the outer surface of the flow channel, which component comprises an annular depression which is fluidically connected to the annular depression for collecting condensation fluid of the droplet separator, wherein the annular depression of the component is fluidically connected to an outflow.

A first embodiment of the flow channel optionally comprises where the at least one vortex generator is displaceable in the radial direction into a position in which it terminates with the inner surface of the flow channel.

A second embodiment of the flow channel, optionally including the first example, further includes where the droplet separator is displaceable in the radial direction into a position in which it terminates with the inner surface of the flow channel.

A third embodiment of the flow channel, optionally including one or more of the previous examples, further includes where the annular depression comprises a condensate collector which is connected to the outflow.

A fourth embodiment of the flow channel, optionally including one or more of the previous examples, further includes where the flow channel comprises at least one wall which is configured so as to be capable of being cooled.

A fifth embodiment of the flow channel, optionally including one or more of the previous examples, further includes where the at least one vortex generator and/or the droplet separator are configured in the form of a ring.

A sixth embodiment of the flow channel, optionally including one or more of the previous examples, further includes where the at least one vortex generator is arranged at a distance in the axial direction of at least twice the inner diameter of the flow channel from the droplet separator.

A seventh embodiment of the flow channel, optionally including one or more of the previous examples, further includes where the inlet comprises a three-way exhaust gas recirculation valve and/or a low-pressure exhaust gas recirculation combination valve or the inlet is fluidically connected to a three-way exhaust gas recirculation valve and/or a low-pressure exhaust gas recirculation combination valve.

An example of a flow channel having an inner surface, an inlet, and an outlet, wherein the inlet is configured for connection in technical flow terms to an exhaust gas return flow channel and the outlet is configured for connection in technical flow terms to an inlet of a compressor, characterized in that the flow channel comprises a center axis and at least one vortex generator is arranged downstream of the inlet and upstream of the outlet and can be displaced in a radial direction, and there is arranged in the inner surface of the flow channel upstream of the outlet and downstream of the at least one vortex generator, an annular recess which extends in the peripheral direction of the flow channel and which is adjoined in the direction of the outlet by a droplet separator which can be displaced in a radial direction, wherein the annular recess is connected in technical flow terms to a discharge.

A first example of the flow channel further comprises where the at least one vortex generator can be displaced in a radial direction into a position in which it terminates with the inner surface of the flow channel.

A second example of the flow channel, optionally including the first example, further includes where the droplet separator can be displaced in a radial direction into a position in which it terminates with the inner surface of the flow channel.

A third example of the flow channel, optionally including one or more of the previous examples, further includes where the annular recess comprises a condensate collector which is connected to the discharge.

A fourth example of the flow channel, optionally including one or more of the previous examples, further includes where the flow channel comprises at least one wall which is constructed to be coolable.

A fifth example of the flow channel, optionally including one or more of the previous examples, further includes where the at least one vortex generator is constructed in the form of a ring.

A sixth example of the flow channel, optionally including one or more of the previous examples, further includes where the at least one vortex generator is arranged with a spacing in an axial direction of at least double the inner diameter of the flow channel from the droplet separator.

A seventh example of the flow channel, optionally including one or more of the previous examples, further includes where the inlet comprises a three-way exhaust gas return valve and/or a low-pressure exhaust gas return combination valve or the inlet is connected in technical flow terms to a three-way exhaust gas return valve and/or a low-pressure exhaust gas return combination valve.

An embodiment of a flow channel with an inner surface, an inlet and an outlet, the inlet being designed for fluid communication with an exhaust gas recirculation flow channel and the outlet for fluid communication with an inlet of a compressor is characterized in that the inlet comprises a central axis and at least one vortex generator is arranged downstream of the inlet and upstream of the outlet, which is displaceable in the radial direction and upstream of the outlet and downstream of the at least one vortex generator is arranged a gutter which runs along the circumference of the outlet and which extends radially outward from the inner surface of the flow channel, in the axial direction from a trap edge and is delimited radially on the inside by an edge running at a distance from the inner surface in the circumferential direction, the gutter being fluidically connected to a drain.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a compressor inlet comprising a condensate collection device arranged between a compressor and a vortex generator, wherein a position of the vortex generator is adjustable in response to an engine operating condition, wherein the condensate collection device comprises a droplet separator fluidly coupled to an annular depression.

2. The system of claim 1, wherein the vortex generator is configured to actuate radially outward when exhaust gas recirculate provided via an exhaust gas recirculation passage is not flowing and radially inward when exhaust gas recirculate is flowing.

3. The system of claim 1, wherein the vortex generator extends radially inward into the compressor inlet by a distance.

4. The system of claim 3, wherein the condensate collection device comprises a condensate edge which extends radially inward by an amount equal to or less than the distance.

5. The system of claim 1, wherein the droplet separator is configured to receive condensate accumulated onto an inner surface of the compressor inlet.

6. The system of claim 1, wherein the droplet separator comprises an annular shape and wherein the annular depression is fluidly coupled to a discharge passage arranged in a lowest point of the compressor inlet relative to gravity.

7. A turbocharger, comprising:
a compressor comprising a compressor inlet;
a condensate collection device arranged within the compressor inlet along an inner surface of the compressor inlet;
a vortex generator arranged directly upstream of the inner surface of the compressor inlet; and
a controller with computer-readable instructions stored on non-transitory memory thereof that when executed enable the controller to:
actuate the vortex generator radially inward in response to exhaust-gas recirculate flowing through the compressor inlet via an exhaust gas recirculation passage; and
actuate the vortex generator radially outward in response to exhaust-gas recirculate not flowing through the compressor inlet.

8. The turbocharger of claim 7, wherein the vortex generator decreases a cross-sectional flow-through area of the compressor inlet when exhaust-gas recirculate is flowing.

9. The turbocharger of claim 7, wherein the vortex generator is flush with the inner surface in response to being actuated radially outward.

10. The turbocharger of claim 7, wherein the condensate collection device comprises an annular gutter angled relative to the inner surface, wherein a space is arranged between the annular gutter and the inner surface.

11. The turbocharger of claim 7, wherein a droplet separator is fluidly coupled to an annular depression at a first end and comprises an opening at a second end in a radial position equal to the inner surface.

12. The turbocharger of claim 11, wherein the annular depression is fluidly coupled to a discharge passage arranged at a lowest point of the compressor inlet.

13. The turbocharger of claim 12, wherein a condensate collector is arranged at a mouth of the discharge passage.

14. A system, comprising:
    a compressor comprising a compressor inlet;
    a condensate collection device arranged within the compressor inlet along an inner surface of the compressor inlet;
    a condensate collector fluidly coupled to the condensate collection device;
    a vortex generator arranged upstream of the inner surface of the compressor inlet; and
    a controller with computer-readable instructions stored on non-transitory memory thereof that when executed enable the controller to:
    actuate the vortex generator radially inward in response to exhaust-gas recirculate flowing through the compressor inlet via an exhaust gas recirculation passage; and
    actuate the vortex generator radially outward in response to exhaust-gas recirculate not flowing through the compressor inlet.

15. The system of claim 14, wherein the condensate collector is fluidly coupled to a discharge passage, wherein the condensate collector and the discharge passage are arranged at a lowest portion of the compressor inlet.

16. The system of claim 14, wherein the vortex generator is less than a third a length of the compressor inlet away from the inner surface.

17. The system of claim 14, wherein the vortex generator is annular.

* * * * *